United States Patent
Ladd et al.

(10) Patent No.: US 6,180,040 B1
(45) Date of Patent: Jan. 30, 2001

(54) METHOD OF FORMING A GOLF BALL CORE

(75) Inventors: Derek A. Ladd, New Bedford; Mitchell E. Lutz, Fairhaven, both of MA (US)

(73) Assignee: Acushnet Company, Fairhaven, MA (US)

( * ) Notice: Under 35 U.S.C. 154(b), the term of this patent shall be extended for 0 days.

(21) Appl. No.: 09/145,882

(22) Filed: Sep. 2, 1998

(51) Int. Cl.⁷ ............................. B29C 43/18; B29C 45/14
(52) U.S. Cl. ........................ 264/248; 264/250; 264/279.1; 264/347
(58) Field of Search .................... 264/250, 266, 264/279.1, 320, 319, 347, 248, 255

(56) References Cited

U.S. PATENT DOCUMENTS

| | | | |
|---|---|---|---|
| Re. 35,293 | 7/1996 | Hiraoka et al. | 473/372 |
| 2,292,396 | 8/1942 | Olin et al. | 18/53 |
| 3,362,937 | 1/1968 | Kent | 260/79.5 |
| 3,502,338 | 3/1970 | Cox | 273/218 |
| 3,666,272 | 5/1972 | Walker et al. | 273/128 |
| 3,671,477 | 6/1972 | Nesbitt | 260/23.5 A |
| 3,883,145 | 5/1975 | Cox et al. | 273/218 |
| 3,979,126 | 9/1976 | Dusbiber | 273/218 |
| 3,981,943 | 9/1976 | Fujio et al. | 260/880 R |
| 3,989,568 | 11/1976 | Issac | 156/182 |
| 4,123,061 | 10/1978 | Dusbiber | 273/220 |
| 4,169,599 | 10/1979 | Fujio et al. | 273/220 |
| 4,266,772 | 5/1981 | Martin et al. | 273/218 |
| 4,546,980 | 10/1985 | Gendreau et al. | 273/218 |
| 4,650,193 | 3/1987 | Molitor et al. | 273/228 |
| 4,692,497 | 9/1987 | Gendreau et al. | 525/263 |
| 4,781,383 | 11/1988 | Kamada et al. | 273/228 |
| 4,852,884 | 8/1989 | Sullivan | 273/230 |
| 4,882,387 | 11/1989 | Tobing | 525/194 |
| 5,006,297 | 4/1991 | Brown et al. | 264/234 |
| 5,019,319 | 5/1991 | Nakamura et al. | 273/218 |
| 5,062,912 | 11/1991 | Hoffman | 156/145 |
| 5,116,060 | 5/1992 | Sullivan et al. | 273/218 |
| 5,403,010 | 4/1995 | Yabuki et al. | 273/220 |
| 5,407,998 | 4/1995 | Horiuchi et al. | 525/133 |
| 5,516,110 | 5/1996 | Yabuki et al. | 473/372 |
| 5,562,287 | 10/1996 | Endo et al. | 273/377 |
| 5,589,546 | 12/1996 | Hiraoka et al. | 525/193 |
| 5,605,512 | 2/1997 | Yamada et al. | 473/354 |
| 5,688,595 | 11/1997 | Yamagishi et al. | 428/375 |

FOREIGN PATENT DOCUMENTS

| 28623/97 | 1/1998 | (AU) . |
|---|---|---|
| 2 299 518 | 10/1996 | (GB) . |

*Primary Examiner*—Jan H. Silbaugh
*Assistant Examiner*—Edmund H. Lee
(74) *Attorney, Agent, or Firm*—Pennie & Edmonds LLP

(57) ABSTRACT

The invention includes methods of forming at least a portion of a golf ball core, and the golf balls prepared thereby, by mixing a resilient polymer component, a free radical initiator system, and a crosslinking agent to provide a first mixture, forming the first mixture into a plurality of shells having a desired shape, first heat curing the shells at a temperature to impart a rigidity sufficient to maintain the desired shape until the shells are assembled and subsequently heat cured, quenching the first heat curing by reducing the shell temperature to inhibit crosslinking while a sufficient amount of free radical initiator system is present to facilitate a second heat curing, providing a center, assembling at least two shells concentrically about the center to form a first mantle layer, wherein the first mantle layer and center together form the ball core, and second heat curing the core at a temperature and for a time sufficient to further crosslink the first mixture and to at least partially crosslink the shells, thereby forming a cured golf ball core.

21 Claims, 2 Drawing Sheets

METHOD OF FORMING A GOLF BALL CORE

FIELD OF THE INVENTION

The present invention relates to components of a multi-layer golf ball and methods for preparing the same, including a core having a center portion and a mantle portion, wherein the mantle portion comprises at least one layer including an amount of a resilient polymer component and a curing system having at least one free radical initiator and is disposed concentrically adjacent the center portion. The mantle is prepared by forming shells having a desired shape, providing a first heat curing to produce semi-rigid shells, assembling the semi-rigid shells about a center portion, and subsequently providing a second heat curing to more permanently combine the shells together to form at least one layer of a mantle about the center.

BACKGROUND OF THE INVENTION

Multi-layer golf balls contain a core, which may comprise one or more layers of solid material (i.e., a "solid" core), or one or more layers of solid material encompassing a liquid therein (a "liquid" core), a mantle, and a cover. Optionally, an elastic winding may also be used to form a layer surrounding the center, as discussed below, to provide desired playing characteristics. Such balls are known as "wound" balls. The terms "center" or "ball center," as used herein, refer to a solid and/or liquid mass around which at least a mantle and cover are formed. The terms "core" or "ball core," as used herein, include a center having one or more layers and a mantle formed of one or more layers. The mantle, also known as an intermediate layer when a cover is present, is disposed between the center and the cover, typically in concentric fashion, with the cover being the outermost portion of the ball. The term "cover," as used herein, means a dimpled layer disposed concentrically about the core.

A number of compositions are known and used in various methods for the manufacture of the core of multi-layer golf balls as discussed below. Some of these processes use curing systems that combine a rubber, curing agent and a peroxide, while others use peroxides or other curing agents having different reactivities or reaction rates to prepare golf ball mantles or other elastomeric compositions.

For example, U.S. Pat. No. 3,989,568 discloses a process and resultant composition for covering golf balls with polyurethane by selecting a system of at least three reactants having different rates of reaction to partially cure cover half shells that can be disposed about a golf ball core and then fully cured to form the ball cover. The system of reactants includes materials having different reaction rates, such as two polyurethane prepolymers and a single curing agent or one prepolymer and two curing agents.

U.S. Pat. Nos. 4,546,980 and 4,692,497 disclose a process of making a solid golf ball having an unexpected increase in initial velocity capability using at least two free radical initiators having different reactivities. The process involves mixing a polymer and metal salt of unsaturated carboxylic acid together at a high temperature, reducing the temperature below the stable temperatures of the free radical initiators, adding the initiators to the polymer mixture and mixing them therein, shaping pieces of mixture slightly larger than the desired golf ball product, and curing them at high temperature to form the center of the ball product.

U.S. Pat. No. 4,650,193 discloses a two-piece golf ball having a core with an outer layer, and a cover, and methods for production of the ball including the use of one or more conventional peroxide, free radical initiator catalysts to crosslink the core and a sulfur-bearing material to modify peroxide crosslinking in the outer layer.

U.S. Pat. No. 4,781,383 discloses a solid three-piece golf ball made by covering a core, which has inner and outer layers, with a shell. The outer layer is prepared by using a metal mold to prepare two hemispherical premolded products, which are used to cover the previously molded inner layer of the core. The outer layer is then cured around the inner layer by heating the entire core before adding the shell.

U.S. Pat. No. 5,006,297 discloses a process for preparing a polyurethane covered golf ball by allowing the polyurethane cover stock material to partially cure in an open mold and subsequently molding a golf ball product, then curing the golf ball product before molding to impart dimples. This process provides curing both prior to and after placing cores in the mold, where the pre-curing is described as essential to the formation of a good smooth ball.

U.S. Pat. No. 5,019,319 similarly discloses a one-piece golf ball or core of a multi-layer ball formed from a rubber composition of a base rubber component modified with an unsaturated carboxylate group. The composition may include a mixture of two or more free radical releasing agents having different reactivity to enhance co-crosslinking.

U.S. Pat. No. 5,116,060 discloses golf balls having an improved coefficient of restitution provided by polymerizing one or more elastomers in the presence of at least one metallic salt of an unsaturated carboxylic acid and a free radical initiator of t-amyl peroxide or blends thereof with one or more organic peroxides having a similar half life.

U.S. Pat. No. 5,688,595 discloses a multi-piece solid golf ball having a core with at least two layers of an inner sphere layer and a surrounding layer, and a cover having outer and inner cover layers. The surrounding layer may be formed by molding half shells in a semi-vulcanized state, enclosing the inner sphere, and compression molding again to yield the core.

It is desirable to use hemispherical shells containing thermoset material(s) to form one or more mantle layers about a golf ball center, although this often results in poor centering of the mantle and other problems in processing because thermoset materials are difficult to work with before they have been crosslinked. Moreover, the polymers typically used in such shells tend to have a memory that urges the polymer back to its earlier or original shape, which necessitates rapid compression molding to crosslink the polymer as soon as the shells are formed.

None of these references, however, recognizes the need for a curing system for use in a golf ball product that permits a partial cure of the mantle prior to assembly to facilitate assembly about a center, while at the same time permitting a subsequent cure without requiring the addition of initiators or other curing agents after the partial cure. There is thus a need for an improved method for manufacturing multi-layer golf balls that avoids the disadvantages present in current curing methods, particularly when using shells to form one or more mantle layers containing thermoset material about a center. It is therefore desired to find a new composition and method for manufacturing a portion of a mantle in a golf ball core using a first and second heat curing, as this will advantageously improve the symmetrical formation of the core in golf balls, facilitate bonding between the shells, and facilitate automated assembly, which greatly reduces production costs.

SUMMARY OF THE INVENTION

The present invention relates to a method of forming at least a portion of a golf ball core by combining a resilient polymer component, a free radical initiator system, and a crosslinking agent to provide a first mixture, forming the first mixture into a plurality of shells having a desired shape, subjecting the shells to a first heat curing at a first temperature and time chosen to impart a rigidity sufficient to maintain the desired shape until the shells are assembled and subjected to a second heat curing, wherein a portion of the initiator system sufficient to initiate the second heat curing remains after the first heat curing, providing a center, assembling at least two shells concentrically about the center to form a first mantle layer, wherein the first mantle layer and center together form the ball core, and subjecting the core to the second heat curing at a second temperature and time sufficient to further crosslink the first mixture and to at least partially crosslink the shells, thereby forming a cured golf ball core.

In one embodiment, the desired shape to which the first mixture is formed is an ellipsoidal shape, which should be understood to include hemispherical shapes as well. In another embodiment, the resilient polymer component is selected to have a high molecular weight average of between about 100,000 to 750,000. In still another embodiment, the method further includes quenching the shells after the first heat curing by cooling the shells to a temperature below about 100° F. In another embodiment, the first mixture is formed into the shells by injection molding. In yet another embodiment, the desired shape is provided by compression molding.

In a further embodiment, the free radical initiator system includes at least one low temperature initiator and at least one high temperature initiator, wherein the low temperature initiator begins reacting at a temperature from about 150° F. to 300° F. and the high temperature initiator begins reacting at a temperature from about 300° F. to 400° F. In a preferred embodiment, the low temperature initiator and the high temperature initiator are each selected to be an organic peroxide. In a more preferred embodiment, the low temperature peroxide component is selected from the group consisting of decanoyl peroxide, lauroyl peroxide, succinic acid peroxide, benzoyl peroxide, di(n-propyl) peroxydicarbonate, di(sec-butyl)peroxydicarbonate, di(2-ethylhexyl)peroxydicarbonate, 1,1-dimethyl-3-hydroxybutyl peroxyneodecanoate, α-cumyl peroxyneodecanoate, 1,1-dimethyl-3-hydroxy-butyl-peroxyneoheptanoate, α-cumyl peroxyneoheptanoate, t-amyl peroxyneodecanoate, t-butyl peroxyneodecanoate, t-amyl peroxypivalate, t-butyl peroxypivalate, 2,5-dimethyl 2,5-di(2-ethylhexnoylperoxy)hexane, t-amyl peroxy-2-ethyl-hexanoate, t-butyl peroxy-2-ethylhexanoate, t-butyl peroxyacetate, t-amyl peroxyacetate, t-butyl perbenzoate, t-amyl perbenzoate, OO-t-amyl-O (2-ethylhexyl) monoperoxycarbonate, di-t-butyl diperoxyphthalate, OO-t-butyl-O-isopropyl monoperoxycarbonate, 2,5-dimethyl-2,5-di(benzoylperoxy)hexane, OO-t-butyl-1-(2-ethylhexyl) monoperoxycarbonate, 1,1-di(t-butylperoxy)-3,3,5-trimethylcyclohexane, 1,1-di-(t-butylperoxy)-cyclohexane, 1,1-di-(t-amylperoxy)-cyclohexane, ethyl-3,3-di-(t-butylperoxy)-butyrate, ethyl-3,3-di-(t-amylperoxy)-butyrate, and mixtures thereof, and the high temperature peroxide component is selected from the group consisting of dicumyl peroxide, 2,5-dimethyl-2,5-di-(t-butylperoxy) hexane, α,α'-bis(t-butylperoxy)diisopropyl-benzene, di-t-butyl peroxide, di-t-amyl peroxide, 2,5-dimethyl-2,5-di-(t-butylperoxy)hexyne-3, cumene hydroperoxide, t-butyl hydroperoxide, t-amyl hydroperoxide, and mixtures thereof.

In another embodiment, the first curing temperature is from about 150° F. to 300° F. and the second curing temperature is from about 300° F. to 400° F. In another embodiment, the first curing is conducted over about 30 seconds to 10 minutes and the second curing is conducted over about 5 minutes to 25 minutes. In one embodiment, it is possible to delay assembly of the shells after the first heat curing due to their increased rigidity.

In yet another embodiment, the center is selected to comprise a wound center, a solid center, or a liquid center. In another embodiment, the method further includes forming at least one additional layer about the center prior to assembling the shells concentrically about the center, after assembling the shells concentrically about the center, or after the second heat curing of the core. In a preferred embodiment, at least one additional layer is formed after the second heat curing of the core to provide a cover disposed concentrically about the golf ball core, thereby forming a golf ball.

In another embodiment, the crosslinking agent is selected to be a metallic salt chosen from the group of a fatty acid, an α,β-monoethylenic unsaturated carboxylic acid, salts thereof, and mixtures thereof. In another embodiment, the crosslinking agent further includes a crosslinking coagent having an acrylate functional moiety, preferably selected from the group of ethylene glycol dimethacrylate, 1,3-butylene glycol dimethacrylate, trimethylolpropane trimethacrylate, and a mixture thereof. In an additional embodiment, the resilient polymer component is selected to be present in an amount from about 35 to 80 weight percent of the first mixture. In yet another embodiment, the method further includes adding to the first mixture a filler to obtain a desired specific gravity including at least one of zinc oxide, tin oxide, barium sulfate, zinc sulfate, calcium carbonate, barium carbonate, clay, tungsten, tungsten carbide, silica, and carbon black, wherein the filler is present in an amount from about 0.5 to 50 weight percent of the composition.

In a preferred embodiment, the method of forming a golf ball core includes combining a 1,4-cis-polybutadiene, a low temperature peroxide, a high temperature peroxide, and a crosslinking agent to provide a first mixture, forming the first mixture into a plurality of semi-ellipsoidal shells, subjecting the shells to a first heat curing at a first temperature between about 200° F. to 300° F. for about 30 seconds to 15 minutes to impart a rigidity sufficient to maintain the semi-ellipsoidal shape while not fully curing the shells until the shells are assembled and subjected to a second heat curing, wherein at least about 50 weight percent of the high temperature peroxide remains after the first heat curing to initiate the second heat curing, providing a center, assembling at least two semi-ellipsoidal shells concentrically about the center to form a first mantle layer, wherein the first mantle layer and center together form the ball core, and subjecting the core to a second heat curing at a second temperature between about 310° F. to 390° F. for about 5 to 25 minutes to further crosslink the shells, thereby forming a cured golf ball core.

In a more preferred embodiment, the method of forming a golf ball core includes combining about 35 to 80 weight percent 1,4-cis-polybutadiene, an amount of low temperature peroxide that reacts at a temperature of between about 210° F. to 290° F., a high temperature peroxide that reacts at a temperature of between about 320° F. to 380° F. and is present in an amount greater than the low temperature peroxide, and a crosslinking agent to provide a first mixture, forming the first mixture into a plurality of semi-ellipsoidal shells, subjecting the shells to a first heat curing at a first temperature between about 210° F. to 290° F. for about 1 to 15 minutes to impart a rigidity sufficient to maintain the semi-ellipsoidal shape until the shells are assembled and subjected to a second heat curing, wherein at least about 50 weight percent of the high temperature peroxide remains after the first heat curing to initiate the second heat curing, providing a center, assembling at least two semi-ellipsoidal shells concentrically about the center to form a first mantle layer, wherein the first mantle layer and center together form the ball core, and subjecting the core to the second heat curing at a second temperature between about 320° F. to 380° F. for about 5 to 25 minutes to further crosslink the first mixture and to at least partially crosslink the shells, thereby forming a cured golf ball core.

BRIEF DESCRIPTION OF THE DRAWINGS

Further features and advantages of the invention can be ascertained from the following detailed description, which is provided in connection with the attached drawings, wherein.

DESCRIPTION OF THE PREFERRED EMBODIMENTS

Figure 1:
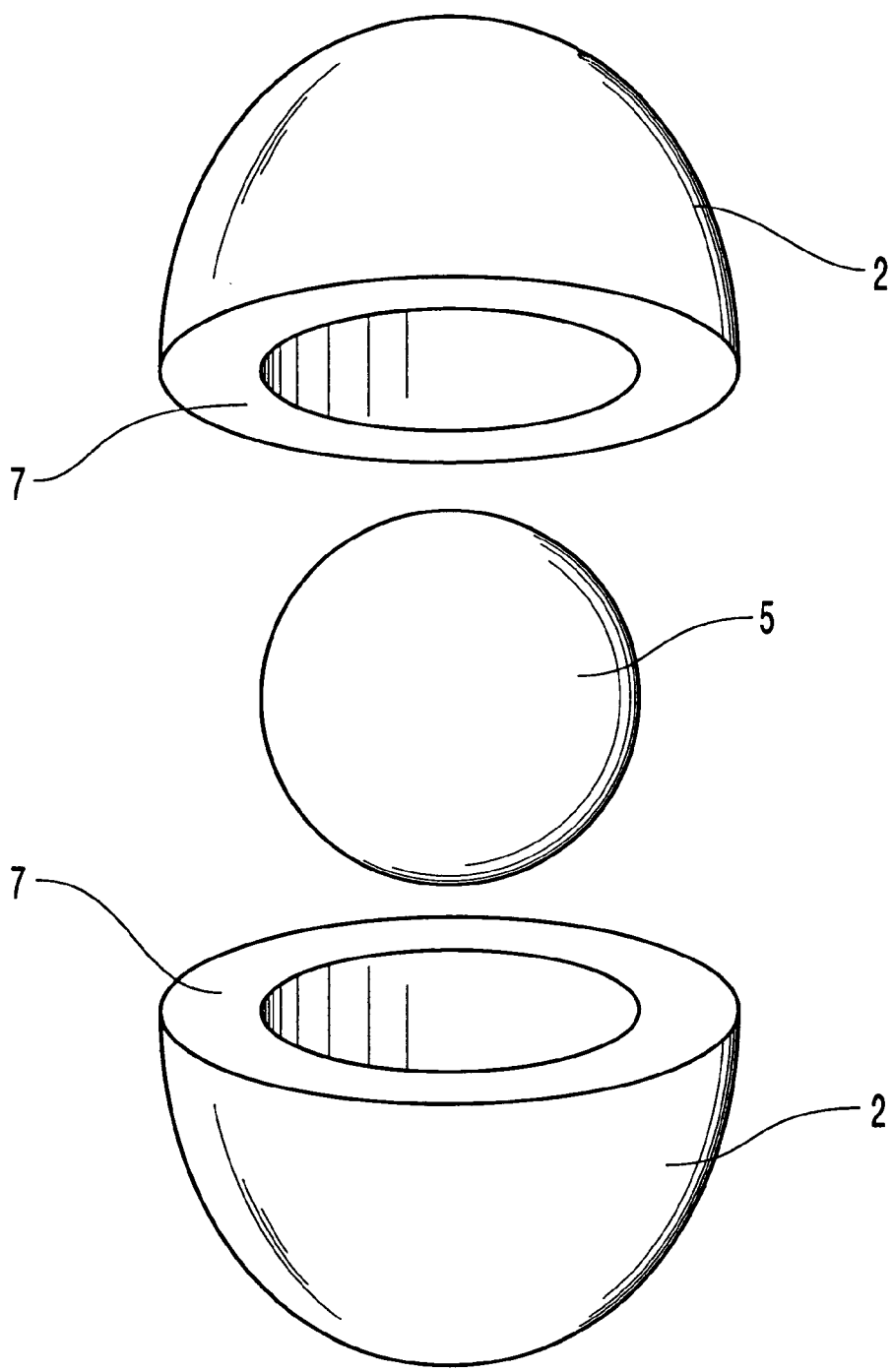
FIG. 1 illustrates two semi-ellipsoidal shells being assembled about a center according to the invention.

As discussed above, resilient polymer components, such as high molecular weight polybutadiene, typically have a "memory" that causes shaped components to attempt to return to their original or previous shape. It has now been discovered that a first curing, also known as an initial curing, initial heat curing, or a pre-cure, of golf ball mantle portions can sufficiently increase the rigidity of the resilient polymer component to impart geometrical stability by partially curing the mantle perform portions, at least in part by inhibiting shifting of the mantle during assembly about the center, without unduly harming the desired characteristics of the final golf ball product. The first heat cure advantageously facilitates retention of the shape imparted to the components by inhibiting or preventing the resilient polymer component from relaxing to an earlier or original position that may result in an off-center ball during further processing. This process greatly facilitates automated assembly, which in turn significantly reduces golf ball production costs. The present invention also involves assembling such pre-cured shells about the center to form the mantle, and providing a second heat curing, also known as a final cure or final heat curing, to additionally enhance bonding between the center and shells and to promote resilience of the mantle.

The center of the ball is typically and preferably spherical, may be solid or liquid-filled, and is generally about 0.5 inches to 1.5 inches, preferably about 0.8 inches to 1.3 inches, and more preferably about 1 to 1.2 inches, in diameter. It is envisioned that the center may be surrounded by a intermediate layer, such as an elastic winding, before the mantle is added, although it is preferred that the mantle be placed on the center without any intervening layers. The mantle should have a thickness of about 0.1 to 0.4 inches, preferably about 0.15 to 0.35 inches, more preferably about 0.2 to 0.3 inches. The entire core of center and mantle should have a diameter of about 1.25 to 1.65 inches, preferably 1.38 to 1.6 inches, where twice the mantle thickness is included in the core diameter since it encloses the center. The diameter of the mantle corresponding to a particular center, and of the cover formed around the mantle and center, may be adjusted according to the diameter of the center to provide a golf ball formed according to the invention with the overall minimum diameter required by the USGA. Each mantle should be thick enough to form the core when molded over the center. The minimum mantle thickness will be readily determined by one of ordinary skill in the art, and depends upon the specific materials used to form the mantle.

The present invention is directed to a method of making a ball and a ball component that advantageously improves the centering of the mantle relative to the core of the ball. The composition used in forming the shells includes a free radical initiator system that assists in making the shells sufficiently rigid to substantially maintain their shape during assembly into a mantle layer about a center. The composition further includes a resilient polymer component, at least one free radical initiator, and optionally one or more of a crosslinking agent or fillers. The method of the invention offers significant advantages over the prior art. In one embodiment, the use of ellipsoidal shaped shells may inhibit the formation of air pockets in the apex of the mold cavities.

The shells, and resultant mantle, for use in forming a ball core include, as noted above, a resilient polymer component. Resilient polymers suitable for use in the ball core include thermoset materials such as polybutadiene, natural rubber, or mixtures thereof. The resilient polymer component is preferably polybutadiene, and more preferably a 1,4-cis-polybutadiene ("PBD"). One example of a 1,4-cis-polybutadiene is SHELL CARIFLEX BR 1220, commercially available from SHELL CO. of Houston, Tex. Other suitable types of resilient polymers are well known to those of ordinary skill in the art. The polybutadiene may be produced with any suitable catalyst that results in greater than about 50 weight percent 1,4-cis content, and preferably with a catalyst that provides an even higher 1,4-cis content and a high molecular weight average. The resilient polymer component has a high molecular weight average, typically from at least about 100,000 to 750,000, preferably from about 150,000 to 350,000, and more preferably from about 200,000 to 325,000. The 1,4-cis component of polybutadiene is generally the predominant portion of the resilient polymer component when polybutadiene is present. "Predominant" or "predominantly" as used herein means greater than 50 weight percent. The 1,4-cis component is preferably greater than about 90 weight percent, and more preferably greater than about 95 weight percent, of the resilient polymer component. The resilient polymer component is typically present in an amount of about 35 to 80 weight percent, preferably about 45 to 60 weight percent, of the composition. The resilient polymer component imparts resilience to the core or mantle in the cured, or crosslinked, state. The resilient polymer component may also contain one or more thermoplastic materials, e.g., polyisoprene, polyethylene, styrene-butadiene rubber, SBS, and nylon, in amounts of up to about 10 weight percent of the total resilient polymer component weight. Preferably, however, the resilient polymer component is substantially free of such thermoplastic materials.

The composition also includes a free radical initiator system having at least one free radical initiator. Suitable free radical initiators include those polymerization initiators that decompose during the cure cycle, such as organic peroxides, hydroperoxides, persulfates, azo compounds, hydrazines, and the like or any other source of free radicals. The free radical initiator system preferably includes any compound or combination of compounds present in an amount sufficient to initiate a crosslinking reaction between a crosslinking agent and the reinforcing and resilient polymer components of the polymer blend. The free radical initiator system more preferably includes organic peroxides, such as 2,5-bis(t-butylperoxy)-2,5-dimethylhexane, 2,2'-bis(t-butylperoxy-isopropyl)benzene, n-butyl-4,4-bis(t-butylperoxy)-valerate, t-amyl peroxide, di(2-t-butyl-peroxyisopropyl)benzene peroxide, 2,4-dichlorobenzoyl peroxide, 1,1-bis(t-butylperoxy)-3,3,5-trimethylcyclohexane, t-butyl cumyl peroxide, and mixtures thereof or with any other suitable organic peroxide. Additional examples of organic peroxides as the low temperature free radical initiator include decanoyl peroxide, lauroyl peroxide, succinic acid peroxide, benzoyl peroxide, di(n-propyl)peroxydicarbonate, di(sec-butyl) peroxydicarbonate, di(2-ethylhexyl)peroxydicarbonate, 1,1-dimethyl-3-hydroxybutyl peroxyneodecanoate, α-cumyl peroxyneodecanoate, 1,1-dimethyl-3-hydroxy-butyl-peroxyneoheptanoate, α-cumyl peroxyneoheptanoate, t-amyl peroxyneodecanoate, t-butyl peroxyneodecanoate, t-amyl peroxypivalate, t-butyl peroxypivalate, 2,5-dimethyl 2,5-di(2-ethylhexnoylperoxy)hexane, t-amyl peroxy-2-ethyl-hexanoate, t-butyl peroxy-2-ethylhexanoate, t-butyl peroxyacetate, t-amyl peroxyacetate, t-butyl perbenzoate, t-amyl perbenzoate, OO-t-amyl-O (2-ethylhexyl) monoperoxycarbonate, di-t-butyl diperoxyphthalate, OO-t-butyl-O-isopropyl monoperoxycarbonate, 2,5-dimethyl-2,5-di(benzoylperoxy)hexane, OO-t-butyl-1-(2-ethylhexyl) monoperoxycarbonate, 1,1-di(t-butylperoxy)-3,3,5-trimethylcyclohexane, 1,1-di-(t-butylperoxy)-cyclohexane, 1,1-di-(t-amylperoxy)-cyclohexane, ethyl-3,3-di-(t-butylperoxy)-butyrate, ethyl-3,3-di-(t-amylperoxy)-butyrate, and mixtures thereof or with other suitable low temperature initiators. Similarly, additional examples of peroxides suitable for use as the high temperature initiator include dicumyl peroxide, 2,5-dimethyl-2,5-di-(t-butylperoxy)hexane, α,α'-bis(t-butylperoxy)diisopropyl-benzene, di-t-butyl peroxide, di-t-amyl peroxide, 2,5-dimethyl-2,5-di-(t-butylperoxy)hexyne-3, cumene hydroperoxide, t-butyl hydroperoxide, t-amyl hydroperoxide, and mixtures thereof. Without being bound by any particular theory, it is believed that organic peroxides have thermally unstable oxygen-oxygen bonds that break when heated to form free radicals. These free radicals can extract hydrogen atoms from polymer chains, such as the resilient polymer component, permitting the resulting polymer radicals to readily crosslink and form stable carbon-carbon bonds. The free radical initiator system is preferably present in an amount of about 0.1 to 4 parts per hundred, more preferably about 0.2 to 1 parts per hundred of the resilient polymer component. When the initiator system includes one or more peroxides, the specific amount of initiator may be readily determined based on the percentage of active oxygen in the peroxide. One of ordinary skill in the art will also be able to select one or more initiators containing radical scavengers that inhibit the reaction, if desired.

Various preferred organic peroxides for use in the free radical initiator system of the present invention are set forth below.

| Free radical initiator | % Active initiator | % Active Oxygen |
|---|---|---|
| 1,1-di(t-butylperoxy)-3,3,5-trimethycyclohexane | 40 | 4.2 |
| di(2-t-butylperoxyisopropyl)benzene | 40 | 3.8 |
| dicumyl peroxide | 99 | 5.9 |
| dicumyl peroxide | 37.5 | 2.2 |
| bis(t-butylperoxy)diisopropylbenzene | 40.5 | 3.8 |
| di(2-t-butylisopropylperoxy)-benzene | 35 | 3.3 |
| 2,5-dimethyl-2,5-di(t-butylperoxy)hexane | 46.5 | 5.1 |
| di(2-t-butylperoxyisopropyl) benzene | 60 | 5.8 |
| di-t-amyl peroxide | 97 | 8.9 |
| dicumyl peroxide | 37.5 | 2.2 |
| benzoyl peroxide | 55 | 3.7 |

% Active initiator varies depending upon the degree to which the initiator is dispersed on a carrier; % Active Oxygen is a weight percent measure of the oxygen—oxygen bonds in a peroxide that is used as a comparative measure like 1 mol of a compound.

A variety of suitable peroxides are commercially available from Elf Atochem North America of Philadelphia, Pa. for use in the invention as a free radical initiator. It is generally more desirable for the initiators, particularly when peroxides are used, to be in a solid form for handling purposes, i.e., dispersed on a carrier, such as those commercially available from RT Vanderbilt Co., Inc. of Norwalk, Conn. The most suitable phase for any particular initiator is readily determinable by one of ordinary skill in the art.

The free radical source may be selected by choosing a compound having a short enough half-life to ensure it is substantially consumed in the time period and at a temperature suitable for use in the invention. For example, approximately 7 half-lives are needed to consume about 99 percent of a compound. Thus, if a curing temperature of around 340° F. and a curing time of around 14–15 minutes is desired, a free radical Asource should be selected that will have a half-life of about two minutes at that temperature to ensure that substantially all of the compound is consumed. An exemplary free radical source is di-t-amyl peroxide, which has a half-life in the appropriate range to consume substantially all of the initiator within 15 minutes at 350° F. The approximate half-life data of di-t-amyl peroxide is as follows:

| Approximate Half-Life | Temperature (° F.) |
|---|---|
| 100 hours | 221.6 |
| 10 hours | 254 |
| 1 hour | 289.6 |
| 6 minutes | 329 |
| 1 minute | 362.7 |
| 1 second | 451.5 |

"Reacting" or "reaction", as used herein with reference to the free radical initiator initiator will be substantially consumed within a reasonable time manufacture of golf balls.

The free radical initiator di-t-amyl peroxide is typically consumed as follows at 350° F.

| Time elapsed (min.) | % initiator remaining |
|---|---|
| 0.25 | 91 |
| 0.5 | 84 |
| 0.75 | 76 |

-continued

| Time elapsed (min.) | % initiator remaining |
|---|---|
| 1 | 70 |
| 1.5 | 58 |
| 2 | 49 |
| 2.5 | 41 |
| 3 | 34 |
| 4 | 24 |
| 5 | 17 |
| 7 | 8 |
| 9 | 4 |
| 10 | 3 |
| 12 | 1 |

Although a first and second heat curing may be conducted using a free radical initiator system having only one free radical source, e.g., only one compound, it is preferred that at least two free radical sources are used selected from those described above. If only one source is used, the crosslinking must be quenched so that enough free radical initiator remains for the second heat curing. Also, use of a single source inhibits control of the process and may result in uneven curing, since uneven heating may result in uneven distribution of the remaining single initiator after the first heat cure is conducted. Thus, it is preferred that at least one low temperature free radical initiator and at least one high temperature free radical initiator are used to most effectively conduct the first and second heat curing steps while permitting the mantle to be assembled about the core between the curing steps and so that substantially all of the high temperature free radical initiator remains in the mantle to facilitate the second heat cure. Use of such a free radical initiator system provides greater control of the partial cure process.

The "low temperature free radical initiator," as used herein, includes any peroxide with a reaction temperature of between about 150° F. to 300° F., preferably between about 200° F. to 300° F., preferably about 210° F. to 290° F. The low temperature initiator is preferably present in about 0.05 to 3 parts per hundred based on the resilient polymer component ("phr"), preferably about 0.1 to 1 phr, of the resilient polymer component. "phr" as used herein means parts per hundred of the resilient polymer component, e.g., polybutadiene. The "high temperature free radical initiator," as used herein, includes any peroxide with a reaction temperature of greater than about 300° F., preferably between about 310° F. to 390° F., more preferably between about 320° F. to 380° F. that is substantially all consumed after 15 minutes. The high temperature initiator is preferably present in about 0.1 to 5 phr, more preferably about 1 to 4 phr, of the resilient polymer component. The low temperature initiator is preferably present in a smaller amount than the high temperature initiator so that the low temperature initiator may be substantially or fully exhausted during the first heat cure without consuming a majority of the high temperature initiator required for the second heat cure. This permits greater control of the crosslinking during the first heat cure, since the type of initiator and amount can be precisely determined to provide consistent quality among a large batch of golf balls. If the low and high temperature initiators have only a small difference between their reaction temperatures, it is desired to rapidly lower the temperature of the composition after the first heat curing to quench further decomposition of the high temperature initiator before assembly and the second heat curing. The high temperature free radical initiator preferably has a half-life of approximately 1–2 minutes at 350° F., which permits substantially all of the initiator to be consumed within 15 minutes. The preferred second heat curing time is typically from about 5 to 25 minutes, preferably from about 8 to 22 minutes, and more preferably from about 10 to 20 minutes, although the free radical initiator is not typically fully consumed during shorter cure times. If any low temperature initiator remains after the first heat curing, the remaining low temperature initiator is available to facilitate initiation of the second heat curing. The less free radical initiator present in the composition, the more quickly it will be consumed at any given temperature. One of ordinary skill in the art will be able to readily select suitable types and amounts of free radical initiators.

Suitable crosslinking agents include one or more monomer, oligomer, or multifunctional acrylates and/or one or more unsaturated fatty acids or $\alpha,\beta$-monoethylenic unsaturated carboxylic acids, or metallic or other salts thereof, such as zinc, calcium, or magnesium acrylate salts, and the like, as are well known in the art. Preferred metallic acrylates include zinc acrylate, zinc diacrylate, and zinc methacrylate. Examples of optional, but preferred, crosslinking coagents that may be used with the crosslinking agents above to enhance performance by adjusting the resultant compression are those having an acrylate functional moiety. Suitable materials having an acrylate functional moiety include ethylene glycol dimethacrylate, 1,3-butylene glycol dimethacrylate, trimethylolpropane trimethacrylate, and mixtures thereof. A variety of suitable crosslinking coagents are available from Sartomer of Exton, Pa. The crosslinking agent must be present in an amount sufficient to crosslink the various chains of polymers in the resilient polymer component to a sufficient degree to provide the desired characteristics of a conventional golf ball. One such characteristic is the compression, where a load is applied to the core to measure the deflection thereof. The desired compression may be achieved, for example, by altering the type and amount of crosslinking agent and free radical initiator, which is a process well known to those of ordinary skill in the art. Altering the type and amount of resilient polymer component, crosslinking coagent, and any optional fillers will also affect the ultimate compression.

The crosslinking agent is typically present in about 1 to 50 parts per hundred, preferably about 20 to 40 parts per hundred, and more preferably about 30 to 35 parts per hundred, of the resilient polymer component. The desired material properties may be measured by the resilience of the crosslinked material. The coefficient of restitution may be calculated by propelling a golf ball against a steel plate, measuring the incoming velocity and the rebounding ball velocity, and dividing the rebounding velocity by the incoming velocity. A suitable coefficient of restitution is typically from about 0.7 to 1, and preferably as close to 1 as possible.

The resilient polymer component, free radical initiator system, crosslinking agent, and any other desired ingredients may be combined by any type of mixing known to one of ordinary skill in the art when forming the material for the mantle portion of the core. Suitable types of mixing include single pass, multi-pass, and the like. A single-pass mixing process where ingredients are added sequentially is preferred, as this type of mixing tends to increase efficiency and reduce costs for the process. Suitable mixing equipment is well known to those of ordinary skill in the art, and such equipment may include a SHAW mixer, BANBURY mixer and/or a twin screw extruder. Conventional mixing speeds for combining polymers are typically used, although the speed must be high enough to mix the various components together. On the other hand, the mixing speed may not be too high, as high mixing speeds tend to break down the polymers being mixed and particularly may undesirably decrease the molecular weight of the resilient polymer component. The speed should thus be low enough to avoid overmasticating the resilient polymer component, which may result in loss of desirable high molecular weight portions of the resilient polymer component. Also, too high a mixing speed may undesirably result in creation of excess heat, which tends to require additional steps to cool the mixer to inhibit reaction of the crosslinking agent before the performs are shaped and assembled around a core. Those of ordinary skill in the art are well aware of suitable methods to compound resilient polymer components without initiating a crosslinking reaction, typically by keeping the temperature as low as possible to inhibit initiation of the crosslinking reaction.

Fillers are typically also added to the composition used in the shells of the mantle, the center, or both ball portions, to modify the specific gravity of the core to adjust the weight thereof to conform to uniform golf ball standards or to change the core's moment of inertia to alter the ball's spin characteristics. Fillers typically include processing aids or compounds added to affect Theological and mixing properties, the specific gravity, the modulus, the tear strength, reinforcement, and the like. The fillers are generally inorganic, and suitable fillers include numerous metals and metal oxides, such as zinc oxide and tin oxide, and barium sulfate, zinc sulfate, calcium carbonate, barium carbonate, clay, tungsten, tungsten carbide, an array of silicas, and the like. The fillers, when used, may be present in an amount of about 0.5 to 50 weight percent of the composition.

Any conventional material or method may be used in forming the golf ball cover over the core. For example, as is well known in the art, ionomers, balata, and urethanes are suitable golf ball cover materials. A variety of less conventional materials may also be used for the cover, e.g., thermoplastics such as ethylene- or propylene-based homopolymers and copolymers. These homopolymers and copolymers may also include functional monomers such as acrylic and methacrylic acid, fully or partially neutralized ionomers and their blends, methyl acrylate, methyl methacrylate homopolymers and copolymers, imidized amino group-containing polymers, polycarbonate, reinforced polycarbonate, reinforced polyamides, polyphenylene oxide, high impact polystyrene, polyether ketone, polysulfone, poly(phenylene sulfide), acrylonitrile-butadiene, acrylic-styrene-terephthalate, poly(ethylene terephthalate), poly(butylene terephthalate), poly(ethylene-vinyl alcohol), poly(tetrafluoroethylene), and the like. Any of these polymers or copolymers may be further reinforced by blending with a wide range of fillers, including glass fibers or spheres. The selection of a suitable cover, and application thereof over the mantle described herein, to obtain desired properties in the golf ball product will be readily determinable by those of ordinary skill in the art when considering the desired playing properties of the golf ball.

The golf ball components and/or golf balls of the present invention are prepared as follows. A solid spherical center including one or more of the resilient polymer materials described herein is prepared by at least one of conventional compression, injection molding, or winding techniques. A liquid-filled center may alternatively be used instead of a solid center. Any additionally desired center layers may then be added to the center by conventional compression or injection molding techniques, preferably in a concentric fashion to maintain a substantially spherical center.

The mantle shells are prepared by mixing the resilient polymer component, the free radical initiator system, at least one crosslinking agent, and any fillers or other ingredients as discussed above together to form a polymer slab of a first mixture. The shells are also referred to by those of ordinary skill in the art as "performs" or "preps." The performs are typically formed into pieces that fit a mold cavity, preferably by forming and slicing the pieces of polymer slab in the desired shapes, such as cylindrical, elliptical, rectangular, or the like. Preferably, the mantle performs are prepared as ellipsoidal half-shells or according to conventional techniques by compression or injection molding. "Ellipsoidal" or "semi-ellipsoidal" half-shells, as used herein, include those that form an ellipsoid, and preferably a sphere, when placed adjacent to an identical half-shell. Thus, an "ellipsoidal" or "semi-ellipsoidal" half-shell should be understood to include, for example, a shell that is at least substantially hemispherical, and preferably hemispherical, in shape. The preferred method is to prepare two ellipsoidal half-shells that fit around the core and merge to form the mantle, or one or more layers thereof. These ellipsoidal half-shells, also known as preps or performs, preferably have a minor axis between about 0.9 to 1 times and a major axis between about 1 to 1.5 times, preferably 1.02 to 1.1 times, the mold cavity diameter when two half-shells are combined to form a mantle. The major and minor axes are measurements of the combination of two adjacent half-shells assembled about a center. The major and minor axes each have different sizes due to the ellipsoidal shape of pairs of performs, and when a pair of semi-ellipsoidal performs is spherical the major and minor axes are each 1. The ellipsoidal performs thus may have thicker crowns at their top and bottom and a thinner equator, i.e., ellipsoidal in shape, than a conventional spherical mantle, which has a constant diameter at any orientation. Thus, the ellipsoidal performs preferably have a volume that is slightly larger than that of the mold as determined by the dimensions described above. This feature inhibits the problems that typically occur with conventional shells, which are prone to trapping air in the apex of the mold cavities in which they are placed when assembling golf ball cores.

After the ingredients are combined into a first mixture and shaped to form the performs, the performs are subjected to a first heat cure, also described herein as a pre-cure or a partial cure. The first heat cure is preferably performed by compression molding, although injection molding is also a suitable alternative. The first cure heats the performs to a temperature sufficient to provide enough crosslinking to the perform to impart sufficient rigidity to inhibit the perform from creeping or shrinking out of shape prior to assembly about the center, while ensuring the temperature is controlled so that a sufficient amount of the free radical initiator system remains in the perform to initiate crosslinking during the second heat cure. The first cure temperature can range from about 150° F. to 500° F., depending upon the free radical initiator system. Preferably, however, the first cure temperature is from about 150° F. to 300° F., more preferably about 200° F. to 300° F. The first cure is generally conducted for about 30 seconds to 15 minutes, preferably for about 1 minute to about 15 minutes, more preferably for about 2 minutes to 7 minutes. The length of first heat curing is dependent upon the molding temperature and the half-life of the peroxide. Preferably, the free radical initiator system contains at least one low and at least one high temperature free radical initiator. In such a system, the first heat curing temperature will be above the reaction temperature of the low temperature initiator but well below that temperature where substantial amounts of the high temperature initiator would decompose.

The geometric stability resulting from the first heat curing provides additional time for processing between perform formation and second heat curing via compression molding. This additional time may be used to improve the quality of the balls during manufacturing, optimize production scheduling, and the like, such as by preparation and stockpiling of semi-rigid partially cured shells to facilitate molding machine shut down for maintenance or tool changes. With enough shells stockpiled, further golf ball manufacture could be carried out even while the perform injection machine is being retooled. The mixture of resilient polymer component, free radical initiator system, crosslinking agent, and any fillers may be extruded or pelletized for introduction into a molding machine for preparation of the mantle.

Following the first heat cure, the performs are generally cooled to a temperature below about 100° F., preferably to about room temperature. The cooling is typically conducted by quenching the molds with chilled water having a temperature between about 33° F. to 50° F., although warmer water such as at room temperature is also suitable. Cooling with chilled water takes approximately one minute, although this will vary depending upon the water temperature. This cooling, also known as quenching, halts the first heat cure crosslinking reactions and leaves a sufficient portion of the free radical initiator system unreacted for use during the second curing after assembly. This "sufficient portion" preferably is greater than about 50 weight percent of the free radical initiator system. In a preferred embodiment, the high temperature free radical initiator is the portion of the free radical initiator system remaining. If a significant difference exists between the reaction temperatures of high and low free radical initiators in the initiator system, the performs do not need to be quenched as quickly or to as great a degree. If the first heat cure temperature is sufficiently below the high temperature free radical initiator reaction temperature, it may be possible to avoid the need for rapid quenching.

After the first heat cure, the performs are assembled about a center. Since the performs have greater rigidity at this point in the processing than conventional performs, further assembly and processing may be delayed for some time. Once assembled, the performs are subjected to a second cure. The core assembly, i.e., the combination of two semi-ellipsoidal performs and a center, may be compression molded. When the mold halves are combined, they essentially, and preferably, form a spherical cavity. Once the mold is closed, the excess material, if any, from the shell crowns is forced out of the mold cavity at the equator where the mold halves abut. The shells are forced together by the mold and substantially cured during the molding. Optionally, if additional mantle layers are desired, e.g., having different characteristics to improve or modify the overall ball qualities, they may be provided over the first mantle layer. Additional mantle layers are preferably added after the previous mantle layer is cured, although they may be added before cure of the previous layer if the pre-cured mantle layer is rigid enough so that substantially no mixing of the layers occurs. The second heat cure permits additional crosslinking in each shell, as well as direct chemical crosslinking between shells since at least some reactive sites remain in the performs prior to second heat cure. Without being limited by a particular theory, this direct crosslinking is believed to provide covalent bonds between the material in the opposed shells, thereby chemically linking them together and providing a more stable golf ball product with a well-bonded interface between the shells.

The second heat cure typically takes about 5 to 25 minutes, preferably about 8 to 22 minutes, although times may vary depending upon the materials used. The second heat curing temperature is typically greater than about 310° F., but must not be so high as to degrade the materials. Typically, the maximum cure temperature will be less than about 500° F., and one of ordinary skill in the art will be able to readily select a suitable second cure temperature. For example, a typical compression molding cycle may take 12 minutes at 345° F. A preferred second cure temperature might be from about 320° F. to 380° F., although this will depend upon the decomposition temperature of the high temperature peroxide. The pressure to be applied is not critical, so long as it is sufficient to inhibit the mold from opening during curing. Generally, the pressure needed is dependent upon the number of mold cavities and the properties of the materials, e.g., a material that has a large expansion at high temperature will require more pressure than a material that does not expand as much. The appropriate pressure, however, is readily determinable by one of ordinary skill in the art. The second cure should be at a temperature sufficient for at least a portion of the free radical initiator system to facilitate crosslinking. For example, when at least one low temperature initiator and at least one high temperature initiator are used, the second cure should be conducted at a temperature greater than the reaction temperature of the high temperature initiator. Since most initiators are somewhat expensive, it is preferred that no excess initiator be used and that substantially all of the initiator present in the composition breaks down within the molding cycle. "Substantially all" in this context means less than about 1 weight percent of the free radical initiator remains in the mantle. Conversely, "substantially all" consumed also means that at least about 90 weight percent, and preferably at least about 95 weight percent, of the free radical initiator decomposes.

FIG. 1 illustrates semi-ellipsoidal shells 2 being assembled about a golf ball center 5 according to the invention. The shells are joined at the equator 7.

Figure 2:
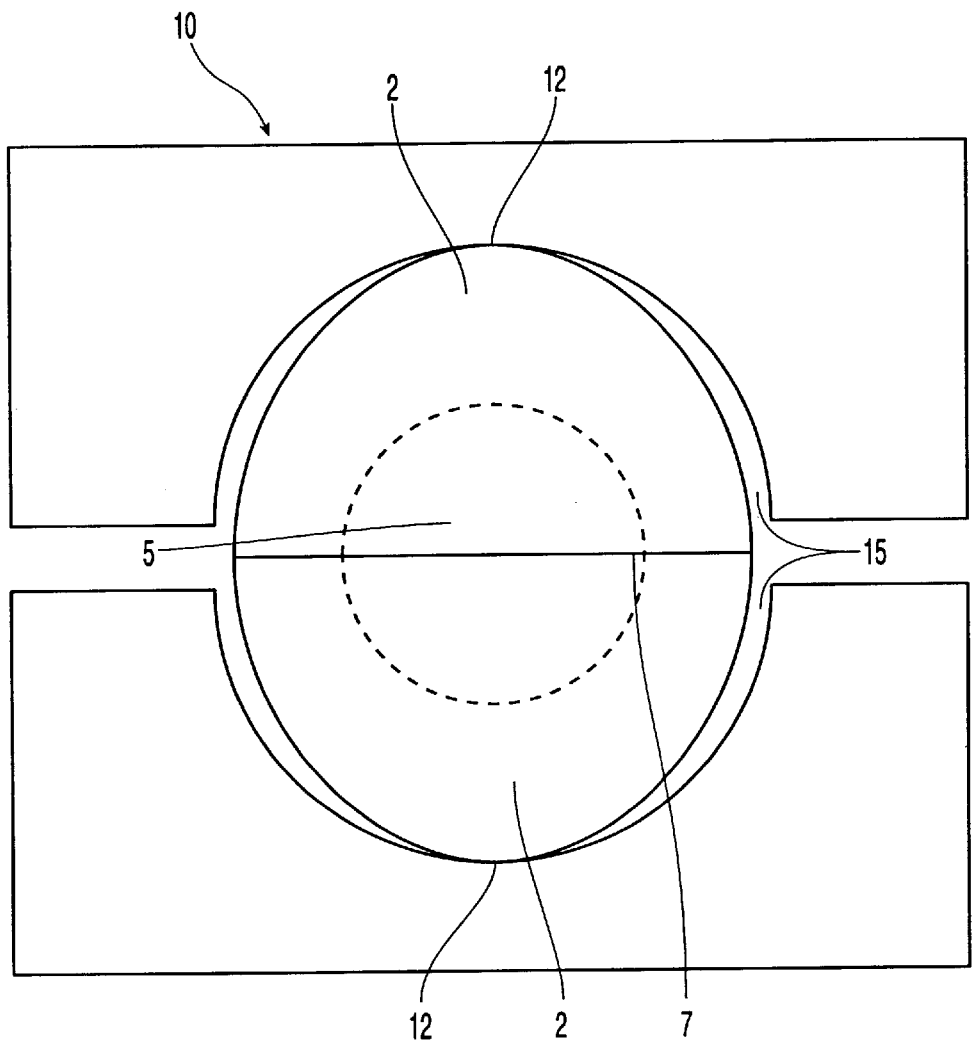
FIG. 2 illustrates a view of two semi-ellipsoidal shells being assembled about a center, and located within a mold cavity, according to the invention.

FIG. 2 illustrates a view of two shells 2 each having semi-ellipsoidal shape being assembled about a center 5 in a compression molding device 10. The molding device preferably contains a hemispherical, concave chamber 15 to form half of the core. The equator 7 of the two shells is depicted, showing where the two semi-ellipsoidal shells 2 contact each other about the center 5. When the semi-ellipsoidal shells are not exactly hemispherical, but instead form an elliptical shape when combined, the apex 12 of the shells 2 contains additional material relative to the side portions by the mutual equator 7 of the shells 2. When the mold 10 is closed and heated, the two hemispherical, concave mold chambers 15 together form an essentially spherical chamber to provide a final shape to the core that is substantially spherical. Excess material from the semi-ellipsoidal shells 2 flows out of the chamber at the interface between the mold halves, i.e., at the equator 7, resulting in a final center that is crosslinked and substantially spherical.

After a suitable cover is applied by conventional techniques, the resulting ball exhibits improved characteristics, such as the low spin and high coefficient of restitution desired by the vast majority of golf players. The semi-ellipsoidal shells, as a result of the first heat cure, have increased rigidity, have a substantially improved concentricity relative to the core, and require less labor to produce. One of ordinary skill in the art of golf ball manufacture, as well as the typical player, will readily recognize that more accurate centering of the ball results in more consistent results and an improved game in addition to the other manufacturing advantages discussed herein.

Figure 3:
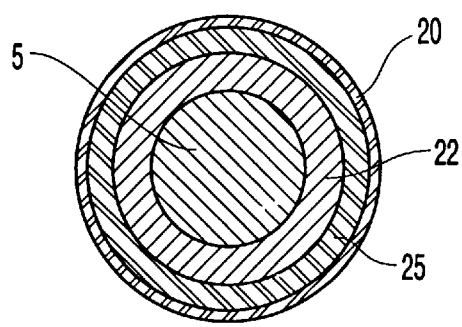
FIG. 3 illustrates a multilayer golf ball having a center, a mantle with several layers, and a cover according to the invention.

Similarly, FIG. 3 illustrates a multi-layer solid golf ball with a cover 20 and a core with a mantle assembled about a center 5 according to the invention. In this embodiment, the mantle includes two mantle layers 22 and 25 according to the invention.

EXAMPLES

The following examples are provided only for the purpose of illustrating the invention and are not to be construed as limiting the invention in any manner.

Example 1

Exemplary Mantle Composition

A sample mantle composition was prepared and mixed according to the techniques described herein. The following formulation was prepared:

| Component | phr/wt % |
|---|---|
| High MW 1,4-cis-PBD | 100/0.78 |
| Zinc diacrylate | 26/0.20 |
| Dicumyl peroxide | 1/0.008 |
| di(2-t-butylperoxyisopropyl)benzene | 0.5/0.004 |
| Coloring agent | 1/0.008 |

The coloring agent is a filler that imparts color to the composition.

Example 2

Additional Exemplary Mantle Composition

A second sample mantle composition was prepared and mixed according to the techniques described herein. This mantle composition used different types and a different amount of free radical initiators from the formulation of Example 1. The following formulation was prepared:

| Component | phr/wt % |
|---|---|
| High MW 1,4-cis-PBD | 100/0.56 |
| Zinc diacrylate | 32/0.18 |
| Tin Oxide | 44/0.25 |
| Coloring agent | 0.25/0.001 |
| 2,5-dimethyl-2,5-di(t-butylperoxy)hexane | 1/0.006 |

Examples 3–5

Improved Centering According to the Invention

Three types of golf balls were tested after cure to determine the degree of accuracy in concentricity. Measured values included the average shift, maximum shift, and minimum shift, of the mantle from the midpoint of the ball. The standard deviation was also calculated. Half shells were measured from top to bottom and from right to left, and the values were averaged to provide the "average shift."

| Example # | Avg. Shift (mm) | STD (mm) | Max Shift (mm) | Min. Shift (mm) |
|---|---|---|---|---|
| 3 (Competitor's ball) | 0.035 | 0.023 | 0.125 | 0.009 |
| 4 | 0.014 | 0.011 | 0.052 | 0.001 |
| 5 | 0.015 | 0.02 | 0.065 | 0.001 |

Example 3 was a competitor's ball core prepared with conventional materials, which resulted in a typically off-center ball. Examples 4–5 were prepared using the materials and methods of the present invention, and clearly resulted in a highly improved concentricity.

It is to be recognized and understood that the invention is not to be limited to the exact configuration as illustrated and described herein. For example, it should be apparent that a variety of suitable materials would be suitable for use in the composition or method of making the golf balls according to the Detailed Description of the Invention. Accordingly, all expedient modifications readily attainable by one of ordinary skill in the art from the disclosure set forth herein are deemed to be within the spirit scope of the present claims.

What is claimed is:

1. A method of forming a golf ball core which comprises:
combining a resilient polymer component, a free radical initiator system, and a crosslinking agent to provide a first mixture;
forming the first mixture into a plurality of half-shells having a desired shape;
subjecting the half-shells to a first heat curing at a first temperature and time chosen to partially crosslink each half-shell so as to impart a rigidity sufficient to maintain the desired shape until the half-shells are assembled and subjected to a second heat curing, wherein a portion of the initiator system sufficient to initiate the second heat curing remains after the first heat curing;
providing a center;
assembling at least two half-shells concentrically about the center to form a first mantle layer, wherein the first mantle layer and center together form the ball core; and
subjecting the core to the second heat curing at a second temperature and for a time sufficient to further crosslink the half-shells, thereby forming a cured golf ball core.

2. The method of claim 1, wherein the desired shape comprises an ellipsoidal half-shell shape.

3. The method of claim 1, wherein the resilient polymer component is selected to have a high molecular weight average of between about 100,000 to 750,000.

4. The method of claim 1, which further comprises quenching the half-shells after the first heat curing by cooling the half-shells to a temperature below about 100° F.

5. The method of claim 1, wherein the first mixture is formed into the shells by injection molding.

6. The method of claim 1, wherein the desired shape is provided by compression molding.

7. The method of claim 1, wherein the free radical initiator system comprises at least one low temperature initiator and at least one high temperature initiator, wherein the low temperature initiator is substantially consumed within about 15 minutes at a temperature from about 150° F. to less than 300° F. and the high temperature initiator is substantially consumed within 15 minutes at a temperature from 300° F. to 400° F.

8. The method of claim 7, wherein the low temperature initiator and the high temperature initiator are each selected to be an organic peroxide.

9. The method of claim 1, wherein the first curing temperature is from about 150° F. to 300° F. and the second curing temperature is from about 300° F. to 400° F.

10. The method of claim 1, wherein the first curing is conducted over about 30 seconds to 15 minutes and the second curing is conducted over about 5 minutes to 25 minutes.

11. The method of claim 1, wherein the center comprises at least one of a wound center, a solid center, or a liquid center.

12. The method of claim 1, which further comprises forming at least one additional layer about the center prior to assembling the half-shells concentrically about the center, after assembling the half-shells concentrically about the center, or after the second heat curing of the core.

13. The method of claim 12, wherein the at least one additional layer is formed after the second heat curing of the core to provide a cover disposed concentrically about the golf ball core, thereby forming a golf ball.

14. The method of claim 8, wherein the low temperature peroxide component is selected from the group consisting of decanoyl peroxide, lauroyl peroxide, succinic acid peroxide, benzoyl peroxide, di(n-propyl)peroxydicarbonate, di(sec-butyl)peroxydicarbonate, di(2-ethylhexyl) peroxydicarbonate, 1,1-dimethyl-3-hydroxybutyl peroxyneodecanoate, α-cumyl peroxyneodecanoate, 1,1-dimethyl-3-hydroxy-butyl-peroxyneoheptanoate, α-cumyl peroxyneoheptanoate, t-amyl peroxyneodecanoate, t-butyl peroxyneodecanoate, t-amyl peroxypivalate, t-butyl peroxypivalate, 2,5-dimethyl 2,5-di(2-ethylhexnoylperoxy) hexane, t-amyl peroxy- 2-ethyl-hexanoate, t-butyl peroxy-2-ethylhexanoate, t-butyl peroxyacetate, t-amyl peroxyacetate, t-butyl perbenzoate, t-amyl perbenzoate, OO-t-amyt-O (2-ethylhexyl) monoperoxycarbonate, di-t-butyl diperoxyphthalate, OO-t-butyl-O-isopropyl monoperoxycarbonate, 2,5-dimethyl-2,5-di(benzoylperoxy) hexane, OO-t-butyl-1-(2-ethylhexyl)monoperoxycarbonate, 1,1-di(t-butylperoxy)-3,3,5-trimethylcyclohexane, 1,1-di-(t-butylperoxy)-cyclohexane, 1,1-di-(t-amylperoxy)-cyclohexane, ethyl-3,3-di-(t-butylperoxy)-butyrate, ethyl-3, 3-di-(t-amylperoxy)-butyrate, and mixtures thereof, and the high temperature peroxide component is selected from the group consisting of dicumyl peroxide, 2,5-dimethyl-2,5-di-(t-butylperoxy)hexane, α, α'-bis(t-butylperoxy)diisopropyl-benzene, di-t-butyl peroxide, di-t-amyl peroxide, 2,5-dimethyl-2,5-di-(t-butylperoxy)hexyne-3, cumene hydroperoxide, t-butyl hydroperoxide, t-amyl hydroperoxide, and mixtures thereof.

15. The method of claim 1, wherein the crosslinking agent is selected to be a metallic salt selected from the group consisting of an unsaturated fatty acid, an α,β-monoethylenic unsaturated carboxylic acid, and mixtures thereof.

16. The method of claim 1, wherein the resilient polymer component is selected to be present in an amount from about 35 to 80 weight percent of the first mixture.

17. The method of claim 1, which further comprises providing a filler comprising at least one of a coloring agent, zinc oxide, tin oxide, barium sulfate, zinc sulfate, calcium carbonate, barium carbonate, clay, tungsten, tungsten carbide, silica, or carbon black to the first mixture, wherein the filler is present in an amount from about 0.5 to 50 weight percent of the composition.

18. The method of claim 15, further comprising a crosslinking coagent of an acrylate functional moiety.

19. The method of claim 18, wherein the crosslinking coagent is selected from the group consisting of ethylene glycol dimethacrylate, 1,3-butylene glycol dimethacrylate, trimethylolpropane trimethacrylate, and a mixture thereof.

20. A method of forming a golf ball core which comprises:
combining a 1,4-cis-polybutadiene, a low temperature peroxide, a high temperature peroxide, and a crosslinking agent to provide a first mixture;
forming the first mixture into a plurality of semi-ellipsoidal half-shells;
subjecting the half-shells to a first heat curing at a first temperature between about 200° F. to 300° F. for about 30 seconds to 15 minutes to impart a rigidity sufficient to maintain the semi-ellipsoidal shape until the half-shells are assembled and subjected to a second heat curing, wherein at least about 50 weight percent of the high temperature peroxide remains after the first heat curing to initiate the second heat curing;
providing a center;
assembling at least two semi-ellipsoidal half-shells concentrically about the center to form a first mantle layer, wherein the first mantle layer and center together form the ball core; and
subjecting the core to the second heat curing at a second temperature between about 310° F. to about 390° F. for about 5 to 25 minutes to further crosslink the shells, thereby forming a cured golf ball core.

21. A method of forming a golf ball core which comprises:
combining about 35 to 80 weight percent 1,4-cis-polybutadiene, an amount of low temperature peroxide that reacts at a temperature of between about 210° F. to 290° F., a high temperature peroxide that reacts at a temperature of between about 320° F. to 380° F. and is present in an amount greater than the low temperature peroxide, and a crosslinking agent to provide a first mixture;
forming the first mixture into a plurality of semi-ellipsoidal half-shells;
subjecting the half-shells to a first heat curing at a first temperature between about 210° F. to 290° F. for about 1 to 15 minutes to impart a rigidity sufficient to maintain the semi-ellipsoidal shape until the half-shells are assembled and subjected to a second heat curing, wherein at least about 50 weight percent of the high temperature peroxide remains after the first heat curing to initiate the second heat curing;
providing a center;
assembling at least two semi-ellipsoidal half-shells concentrically about the center to form a first mantle layer, wherein the first mantle layer and center together form the ball core; and
subjecting the core to the second heat curing at a second temperature between about 320° F. to 380° F. for about 5 to 25 minutes to further crosslink the shells, thereby forming a cured golf ball core.

* * * * *